United States Patent [19]

Hayase

[11] Patent Number: 5,032,770
[45] Date of Patent: Jul. 16, 1991

[54] IMAGE DISTORTION CORRECTING CIRCUIT

[75] Inventor: Akihiko Hayase, Takatsuki, Japan

[73] Assignee: Matsushita Electric Industrial Co., Ltd., Kadoma, Japan

[21] Appl. No.: 448,103

[22] Filed: Dec. 12, 1989

[30] Foreign Application Priority Data

Dec. 13, 1988 [JP] Japan .................................. 63-314081

[51] Int. Cl.[5] .......................... H01J 29/70; H01J 29/76
[52] U.S. Cl. .................................................. 315/408
[58] Field of Search ................................ 315/411, 408

[56] References Cited

U.S. PATENT DOCUMENTS 4,823,052  4/1989  Onozawa et al. ..................... 315/408

*Primary Examiner*—Theodore M. Blum
*Attorney, Agent, or Firm*—Cushman, Darby & Cushman

[57] ABSTRACT

A voltage of a high voltage power source for accelerating an electron beam of a CRT varies responding to brightness of an image on a screen of the CRT, and a deflection angle of the electron beam is varied accordingly, the variation of the voltage is detected and is superimposed on a direct current power source voltage of a horizontal deflection circuit, hence a horizontal deflection output current of the horizontal deflection circuit is varied and the deflection angle of the electron beam is regulated to compensate the variation of the deflection angle due to the voltage variation of the high voltage power source.

3 Claims, 3 Drawing Sheets

IMAGE DISTORTION CORRECTING CIRCUIT

FIELD OF THE INVENTION AND RELATED ART STATEMENT

1. Field of the Invention

The present invention relates generally to an image distortion correcting circuit in a television receiver, and more particularly to a distortion compensation circuit for correcting distortions of images to be displayed on a screen of a cathode ray tube (CRT) of the television receiver caused by voltage fluctuation of a high voltage which accelerates electron beams of the CRT.

2. Description of the Related Art

FIG. 3 is a circuitry of an image distortion correcting circuit in the prior art wherein a horizontal deflection circuit HD of a diode modulation type, an amplifier VLA and a high voltage power source 30 are mutually connected. Referring to FIG. 3, the high voltage power source 30 composed of a high voltage generating circuit 30A and a flyback transformer circuit 29 which issues a high voltage VH for accelerating an electron beam to a display screen of a CRT in a manner familiar to one skilled in the art. The high voltage VH is divided by voltage-dividing resistors 31 and 32 in the flyback transformer circuit 29, to issue a comparatively low voltage VL. The low voltage VL is applied to the base of a buffer transistor 59 of the amplifier VLA and is amplified therein. The output of the amplifier VLA is issued from the collector of a transistor 44 and is applied to a capacitor 5b of the horizontal deflection circuit HD through a resistor 41. In image display on a CRT screen, when a brightness of an image rises, the output current of the high voltage power source 30 also rises, and the high voltage VH lowers because of a voltage drop due to internal impedance of the high voltage power source 30. The voltage drop of the high voltage VH results in a reduction of an electron speed of the electron beam in the CRT, and hence a deflection angle of the electron beam increases. Accordingly, the image displayed on the CRT screen is stretched in the horizontal direction. In the horizontal deflection circuit HD of the diode modulation type, the horizontal deflection current has been adjusted by superimposing the output of the transistor 44 onto the voltage of the capacitor 5b, since the deflection current flowing in a horizontal deflection coil 4a is inversely proportional to a charged voltage of the capacitor 5b. Thereby, image distortion due to variation of the high voltage VH is compensated.

In the horizontal deflection circuit HD in the prior art, a comparatively high voltage is applied to a horizontal signal output transistor 1, resonance capacitors 2a and 2b, damper diodes 3a and 3b and the capacitors 5a and 5b. Therefore, these components must have higher break down voltages. Such high break down voltage components are inevitably large in size and are expensive.

Moreover, in the prior art, since the amplifier VLA uses AC-coupling circuits, an alternating current component of the voltage VL is superimposed on a base bias voltage of the transistor 46. The base bias voltage is determined by resistors 48 and 50 and a potentiometer 49 which are coupled in series across a power source Vcc2 and the ground. Consequently the base voltage of the transistor 46 increases or decreases with respect to the base bias voltages by superimposing of the alternating current component of the voltage VL. Therefore, the collector voltage of the transistor 44 varies in a similar manner to the base voltage of the transistor 46. Thus an undesirable compensation voltage is applied to the capacitor 5b and an image on the CRT even when no distortion is presented.

OBJECT AND SUMMARY OF THE INVENTION

An object of the present invention is to provide an image distortion correcting circuit for correcting distortion in an image on a CRT screen by superimposing an adequate control signal responding to variation of a high voltage for accelerating electron beams onto a power source voltage of a horizontal deflection circuit.

The image distortion correction circuit in accordance with the present invention comprises:
  voltage variation detecting means for detecting a voltage variation of a high voltage power source for accelerating an electron beam to a screen of a cathode ray tube,
  voltage regulation means for regulating a voltage of a direct current power source of horizontal deflection means for deflecting the electron beam in a horizontal direction on the screen, in response to the voltage variation of the high voltage power source.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
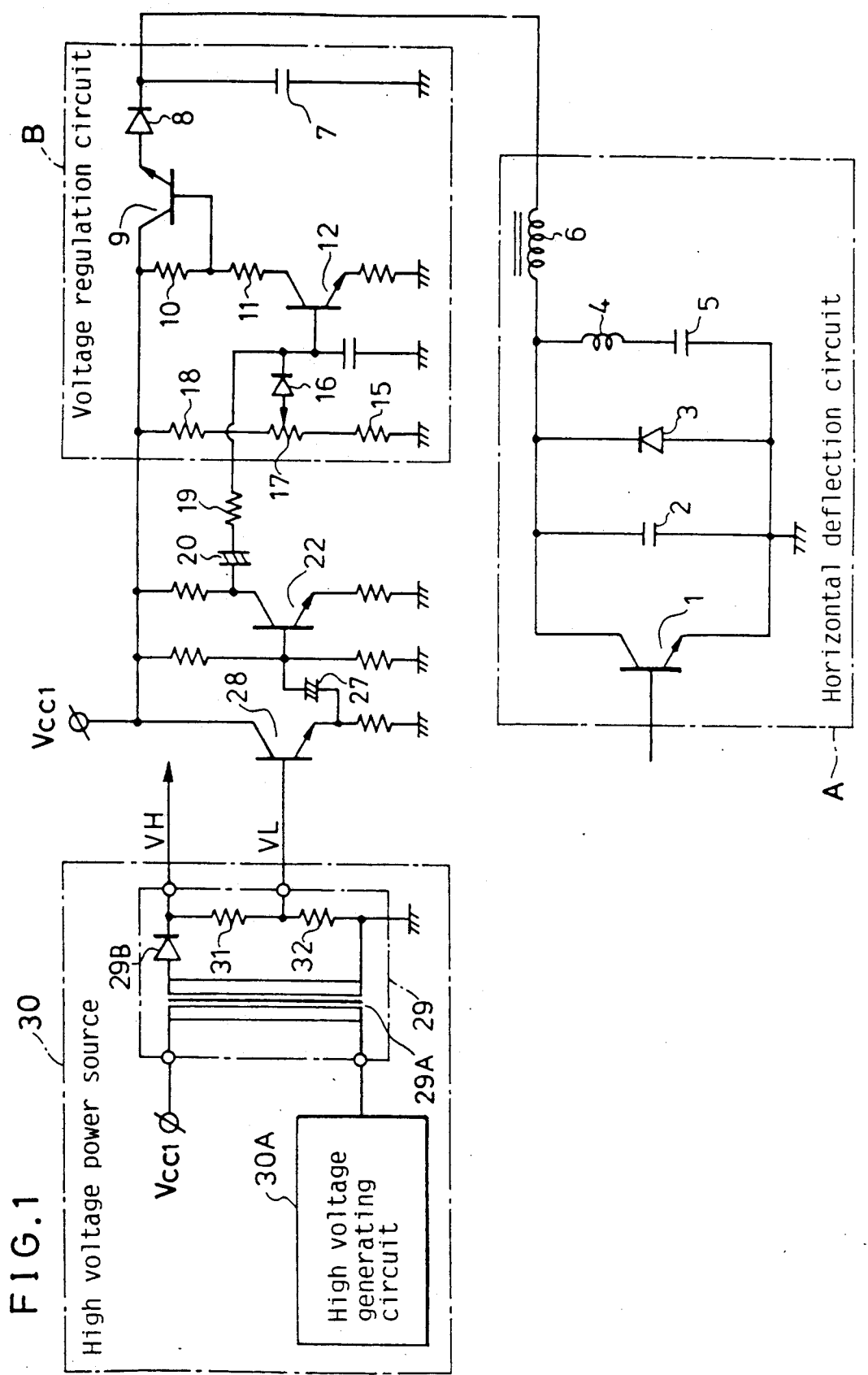
FIG. 1 is a circuitry of an embodiment of an image distortion correcting circuit in accordance with the present invention.

FIG. 1 is a circuitry of an embodiment of the image distortion correcting circuit in accordance with the present invention.

A horizontal resonance circuit A comprises a transistor 1 for outputting a horizontal deflection signal, a horizontal resonance capacitor 2, a damper diode 3, a horizontal deflection coil 4, a S-shaped characteristic compensation capacitor 5 and a horizontal choke coil 6. A voltage regulation cirucit B has voltage dividing resistors 15 and 18 and a potentiometer 17 connected in series, sandwiching the potentiometer 17 between both the resistors 15 and 18 across a power source Vcc1 and the ground, and the wiper of the potentiometer 17 is coupled to the base of a transistor 12 through a diode 16, whose cathode is coupled to the base. A transistor 9 is coupled at the collector to the power source Vcc1, and is coupled at the emitter to an output terminal of the voltage regulation circuit B through a diode 8 which is forward biased. The base of the transistor 9 is coupled to a junction between two resistores 10 and 11, which are coupled in series between the power source Vcc1 and the collector of the transistor 12. A high voltage output from a flyback transformer 29A of a known high voltage power source 30 is rectified by a diode 29B and is divided into a low voltage VL by voltage-dividing resistors 31 and 32. The voltage VL is applied to the base of the emitter-follower transistor 28, and the output of the transistor 28 is applied to the base of the transistor 22 through a capacitor 27. Therefore, the alternating current (A.C) component of the low voltage VL is applied to the base of the transistor 22 and is amplified thereby. The output of the transistor 22 is applied to the base of the transistor 12 through a series connection of a capacitor 20 and a resistor 19. Consequently, the minimum base voltage of the transistor 12 is clamped to a voltage which is a difference between an anode voltage of the diode 16 and a forward direction voltage drop (VF) thereof.

FIGS. 2(a) through 2(e) show voltage variations in operation of the embodiment.

Figure 2A:
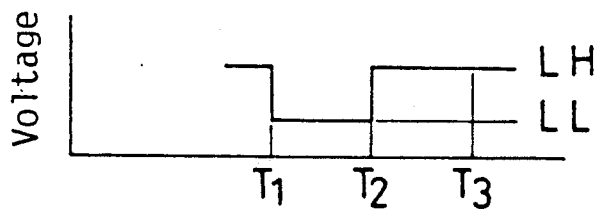
FIGS. 2(a), 2(b), 2(c), 2(d) and 2(e) are figures of voltage variations.
Figure 2B:
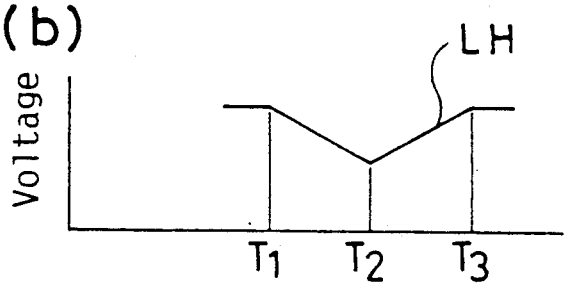
Figure 2C:
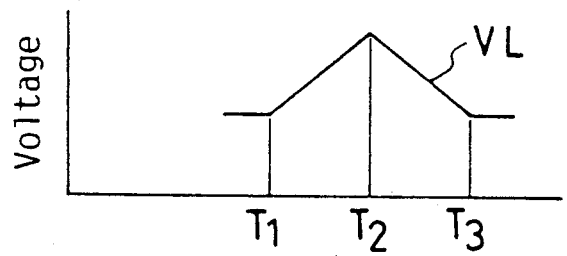
Figure 2D:
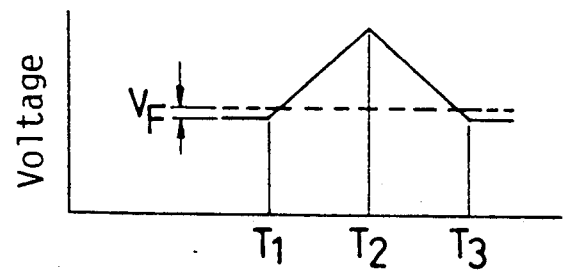
Figure 2E:
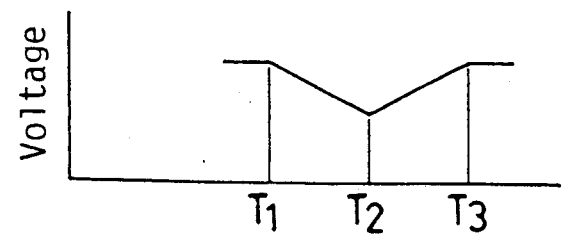
Figure 3:
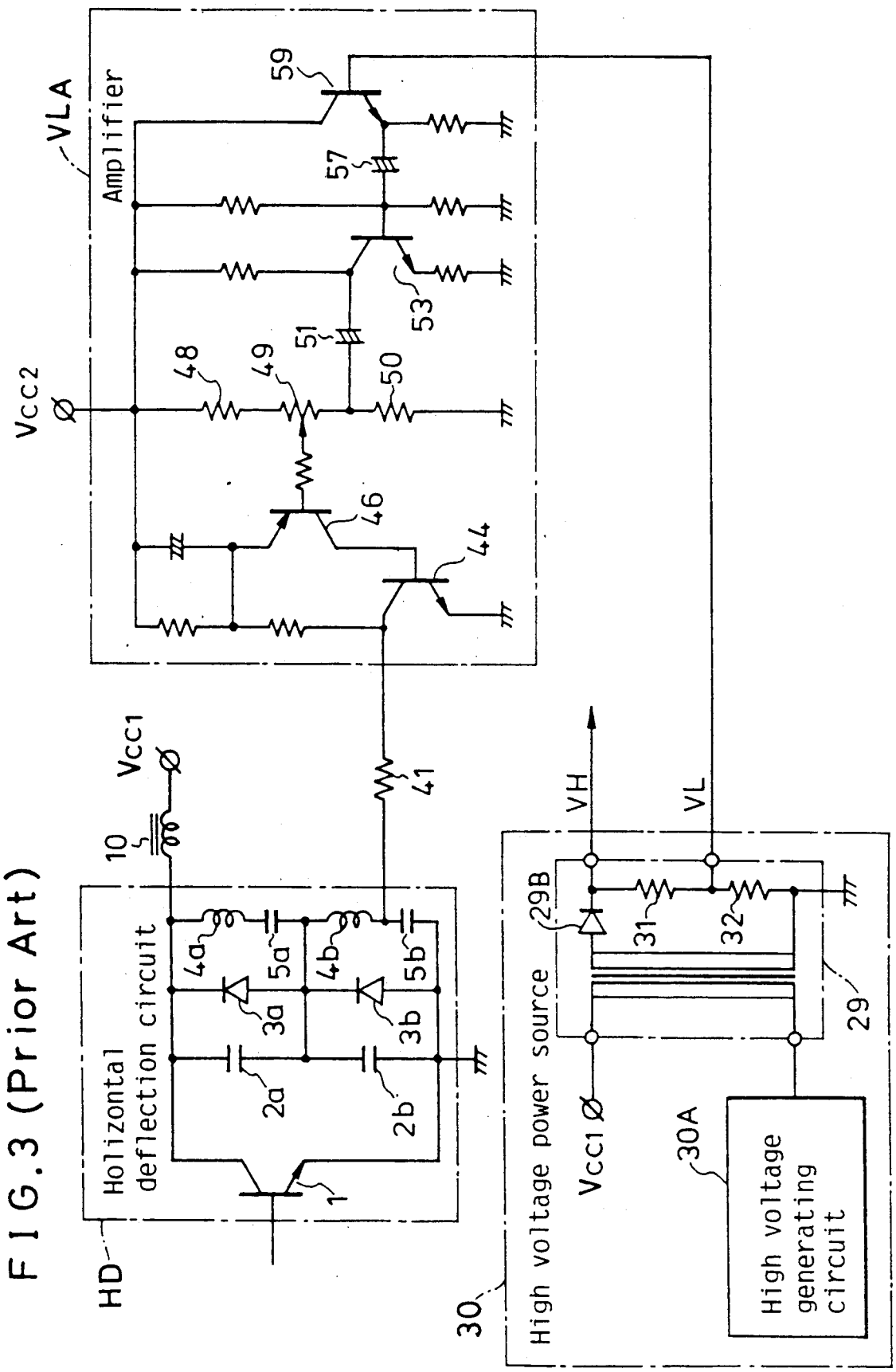
FIG. 3 is the circuitry of the image distortion correcting circuit in the prior art.

FIG. 2(a) shows variation of a voltage applied to a cathode of a CRT. For instance, the cathode is held at a low voltage LL between times $T_1$ and $T_2$ for displaying a bright image, and is held at a high voltage LH between times $T_2$ and $T_3$ for displaying a dark image. In the bright image period between the times $T_1$ and $T_2$, an output current of the high voltage power source 30 is increased to a higher level. Consequently, the output voltage VH of the high voltage power source 30 decreases from the time $T_1$ to time $T_2$ as shown in FIG. 2(b), and during the same period, the divided voltage VL decreases. Thus the collector voltage of the transistor 22 increases from the time $T_1$ to time $T_2$ as shown in FIG. 2(c), and the base voltage of the transistor 12 also increases from time $T_1$ to time $T_2$ as shown in FIG. 2(d). The base voltage of the transistor 12 is clamped by the diode 16. The anode voltage of the diode 16 is a divided-voltage by the resistor 18, the potentiometer 17 and the resistor 15, and thus the base voltage of the transistor 12 is lower than the anode voltage of the diode 16 by a forward direction voltage drop VF of the diode 16. The anode voltage is shown with a horizontal dotted line in FIG. 2(d). The A.C. component of the collector voltage of the transistor 22 is superimposed on the minimum base voltage of the transistor 12 through the capacitor 20. By the addition of the A.C. component voltage, the collector voltage of the transistor 12 decreases from the $T_1$ to time $t_2$ and the emitter voltage of the transistor 9 decreases at the same time as shown in FIG. 2(e), and hence the output voltage of the voltage regulation circuit B also decreases. Consequently, the current which is supplied to the horizontal deflection coil 4 decrease from the time $T_1$ to time $T_2$, and therefore, the horizontal deflection angle of the electron beam is decrease from time $T_1$ to time $T_2$. In other words, the length of the raster is adjusted to decrease from the time $T_1$ to time $T_2$, and thereby, distortion of an image displayed on the CRT is corrected.

Referring to FIG. 2(a), the voltage applied to the cathode of the CRT varies from the hitherto low voltage LL to the high voltage LH at the time $T_2$ to change from display a hitherto white image to a dark image. The operations at various parts in the circuit of the embodiment from the time $T_2$ to a time $T_3$ are inverse to the operation from the time $T_1$ to the time $T_2$, as shown in FIG. 2(a), through FIG. 2(e).

In the embodiment of the present invention, since a simplified horizontal resonance circuit is utilizable, the number of the expensive components of a high break down voltage is reduced.

Furthermore, in the embodiment, the base of the transistor 12 is clamped by the diode 16 and is held to a constant voltage in spite of superimposing of the alternate current component of the voltage VL. Therefore, the variation of the base voltage of the transistor 12 complies with the variation of the voltage VL, and the variation of the output voltage of the voltage regulation circuit B also complies with the variation of the voltage VL. And, adequate compensation of a distorted image is realizable.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is

1. An image distortion correcting circuit comprising:
voltage variation detection means for detecting a voltage variation of a high voltage power source and for accelerating an electron beam to a screen of a cathode ray tube,
horizontal deflection means comprising a transistor means for outputting a horizontal deflection signal, a horizontal resonance capacitor coupled between a collector and emitter of said transistor means, a damper diode coupled in parallel with said horizontal resonance capacitor, a series connection of a horizontal deflection coil and a capacitor with an S-shaped characteristic of compensation coupled across said damper diode and a horizontal choke coil which is coupled to said collector of said transistor means at one terminal. and
voltage regulation means for regulating a voltage of a direct current power source for horizontal deflection in response to said voltage variation of said high voltage power source, and having an output connected to the output terminal of said voltage regulation means and to the other terminal of said choke coil.

2. An image distortion correction circuit in accordance with claim 1, wherein
said voltage regulation means comprises a transistor coupled at the collector to said direct current power source (Vcc1), at the emitter to the other terminal of said choke coil of said horizontal deflection means through a diode, and at the base to an output terminal of a voltage superimposing means for superimposing said voltage variation of said high voltage power source to the base of said transistor.

3. An image distortion correction circuit in accordance with claim 2, wherein
a voltage which is applied to the base of said transistor is clamped by a diode to a voltage which is lower then a voltage determined by a predetermined base bias voltage.

* * * * *